United States Patent
Appasamy et al.

(10) Patent No.: US 9,365,244 B2
(45) Date of Patent: Jun. 14, 2016

(54) CROSSMEMBER FOR A VEHICLE DASHBOARD PROVIDED WITH A REINFORCING BACK BRACE MADE OF A FIBROUS COMPOSITE

(71) Applicant: FAURECIA INTERIEUR INDUSTRIE, Nanterre (FR)

(72) Inventors: Jean Michel Appasamy, Jouras Pontchartrain (FR); Christian Brancheriau, Herblay (FR); Sergio Da Costa Pito, Courdimanche (FR); Mickael Trannoy, Cauvigny (FR)

(73) Assignees: FAURECIA INTERIEUR INDUSTRIES, Nanterre (FR); PEUGEOT CITROEN AUTOMOBILES SA, Velizy Villacoublay (FR)

(*) Notice: Subject to any disclaimer, the term of this patent is extended or adjusted under 35 U.S.C. 154(b) by 0 days.

(21) Appl. No.: 14/406,067

(22) PCT Filed: Jun. 3, 2013

(86) PCT No.: PCT/EP2013/061389
§ 371 (c)(1),
(2) Date: Dec. 5, 2014

(87) PCT Pub. No.: WO2013/182522
PCT Pub. Date: Dec. 12, 2013

(65) Prior Publication Data
US 2015/0151793 A1 Jun. 4, 2015

(30) Foreign Application Priority Data
Jun. 7, 2012 (FR) ...................................... 12 55343

(51) Int. Cl.
*B62D 25/14* (2006.01)
*B62D 29/04* (2006.01)
(Continued)

(52) U.S. Cl.
CPC .......... *B62D 25/145* (2013.01); *B29D 99/0003* (2013.01); *B62D 29/043* (2013.01); *B29K 2101/12* (2013.01); *B29K 2307/04* (2013.01); *Y10T 29/49622* (2015.01)

(58) Field of Classification Search
CPC .... B62D 25/14; B62D 25/145; B62D 25/147; B62D 29/04; B62D 29/043; B62D 29/046; B62D 29/041; B62D 29/048
USPC ................... 296/193.02, 70, 72, 208, 901.01; 180/90
See application file for complete search history.

(56) References Cited

U.S. PATENT DOCUMENTS 5,311,960 A * 5/1994 Kukainis ............... B60R 21/045
180/90
5,354,114 A * 10/1994 Kelman ............... B60H 1/0055
296/192
(Continued)

FOREIGN PATENT DOCUMENTS

DE   102010021123 A1   11/2011
DE   102010037462 A1   3/2012

OTHER PUBLICATIONS

Written Opinion of corresponding application PCT/EP2013/061389 mailed Jul. 15, 2013.
(Continued)

*Primary Examiner* — Gregory Blankenship
(74) *Attorney, Agent, or Firm* — Polster, Lieder, Woodruff & Lucchesi

(57) ABSTRACT

The invention relates to a vehicle dashboard crossmember (2) including a crossbar which extends lengthwise along a generatrix line (G) that is directed substantially along the width of the vehicle body and transversely relative to the direction of travel of said vehicle, as well as at least one connection flange (3, 4) designed to enable said crossbar (2) to be attached to said body, said crossbar (2) consisting, over at least a portion of the length thereof, of a load-bearing web (10) that has a side wall (11) rounded about said generatrix line (G) so as to have, in a cross-section perpendicular to the generatrix line, a first arm (12) and a second arm (13) that are connected to one another via a common connection portion (14) and which thus define a cavity (15), and of a reinforcing brace (20) made of a fibrous composite material.

15 Claims, 2 Drawing Sheets

(51) Int. Cl.
  *B29D 99/00* (2010.01)
  *B29K 101/12* (2006.01)
  *B29K 307/04* (2006.01)

(56) References Cited

U.S. PATENT DOCUMENTS

| | | | | |
|---|---|---|---|---|
| 5,358,300 | A * | 10/1994 | Gray | B60H 1/00028 296/192 |
| 5,823,602 | A * | 10/1998 | Kelman | B60K 37/00 180/90 |
| 5,934,744 | A | 8/1999 | Jergens et al. | |
| 6,073,987 | A * | 6/2000 | Lindberg | B62D 65/14 180/90 |
| 6,234,569 | B1 * | 5/2001 | Derleth | B60H 1/0055 280/779 |
| 6,273,495 | B1 * | 8/2001 | Haba | B60H 1/0055 180/90 |
| 6,409,590 | B1 * | 6/2002 | Suzuki | B60H 1/0055 296/70 |
| 6,582,005 | B2 * | 6/2003 | Takano | B60K 37/00 180/90 |
| 6,688,680 | B1 * | 2/2004 | Cooper | B62D 25/145 296/208 |
| 6,890,016 | B2 * | 5/2005 | Brancheriau | B60K 37/00 296/193.02 |
| 6,921,127 | B2 * | 7/2005 | Feith | B60H 1/00564 296/193.02 |
| 6,942,910 | B2 * | 9/2005 | Roberts | B29D 22/00 296/208 |
| 7,000,969 | B2 * | 2/2006 | Baker | B60H 1/0055 296/70 |
| 2002/0038965 | A1 * | 4/2002 | Palazzolo | B60H 1/0055 296/208 |
| 2004/0188885 | A1 | 9/2004 | Lorenzo et al. | |
| 2004/0262954 | A1 * | 12/2004 | Scheib | B62D 25/142 296/193.02 |
| 2007/0194605 | A1 * | 8/2007 | Merkle | B62D 25/142 296/193.02 |
| 2007/0262617 | A1 * | 11/2007 | Feith | B62D 25/142 296/205 |
| 2011/0204611 | A1 * | 8/2011 | Ziegler | B29C 70/521 280/781 |
| 2014/0319879 | A1 * | 10/2014 | Reese | B29C 70/32 296/193.02 |
| 2014/0346811 | A1 * | 11/2014 | Zaluzec | B29C 70/30 296/187.12 |
| 2015/0145275 | A1 * | 5/2015 | Baudard | B62D 25/145 296/72 |
| 2015/0151793 | A1 * | 6/2015 | Appasamy | B62D 25/145 296/72 |

OTHER PUBLICATIONS

International Search Report of corresponding application PCT/EP2013/061389 mailed Jul. 15, 2013.

* cited by examiner

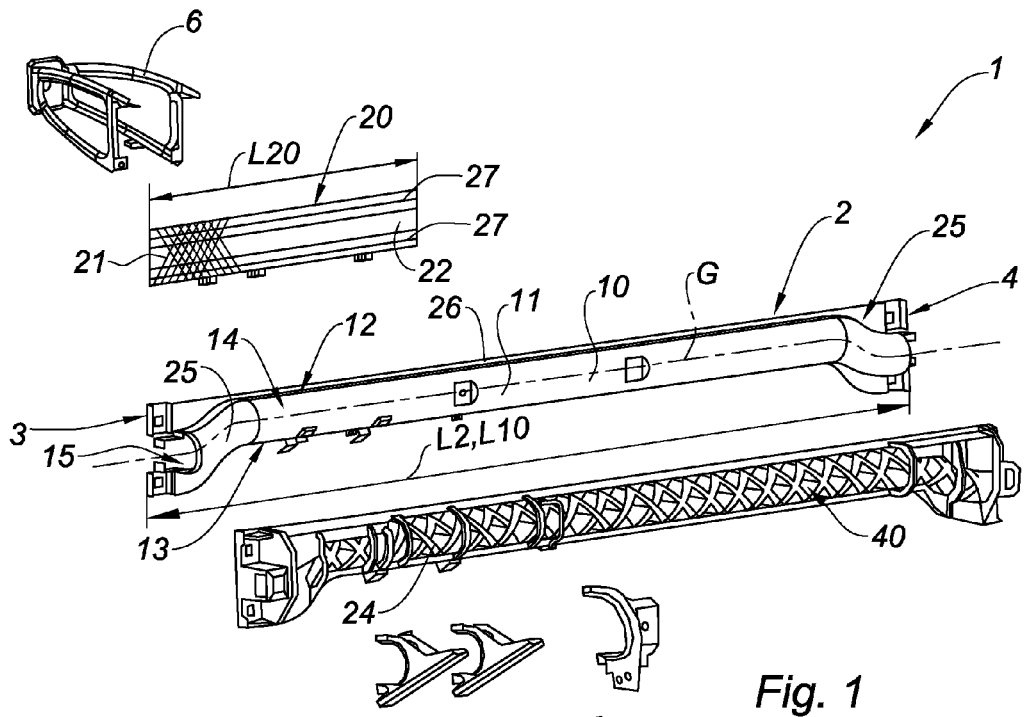
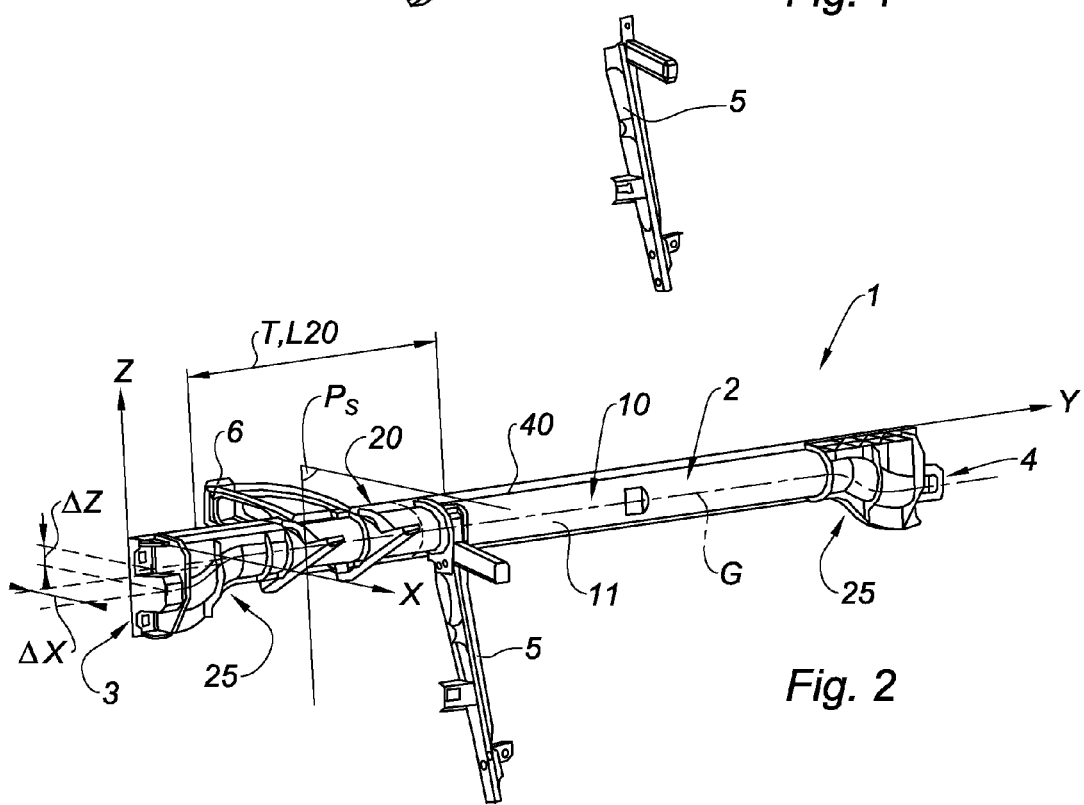

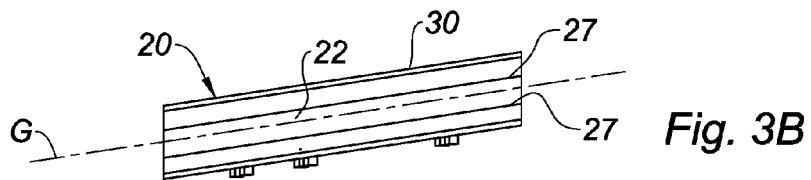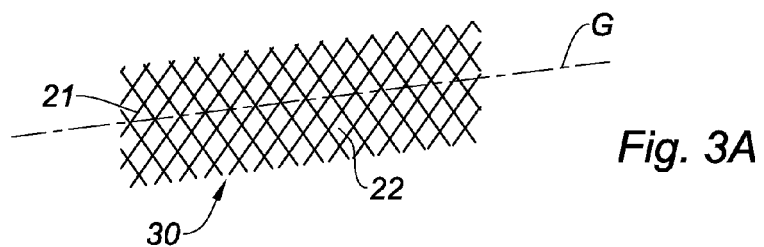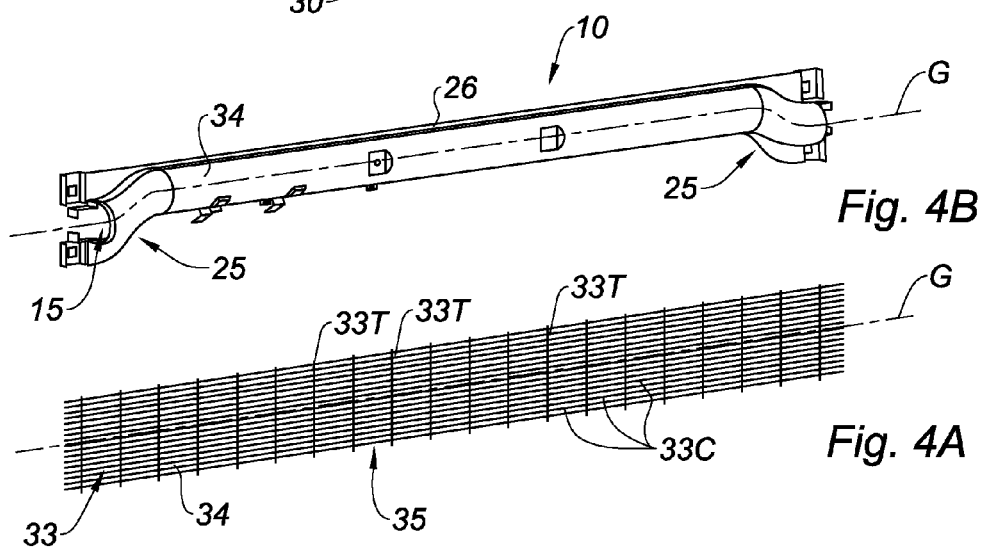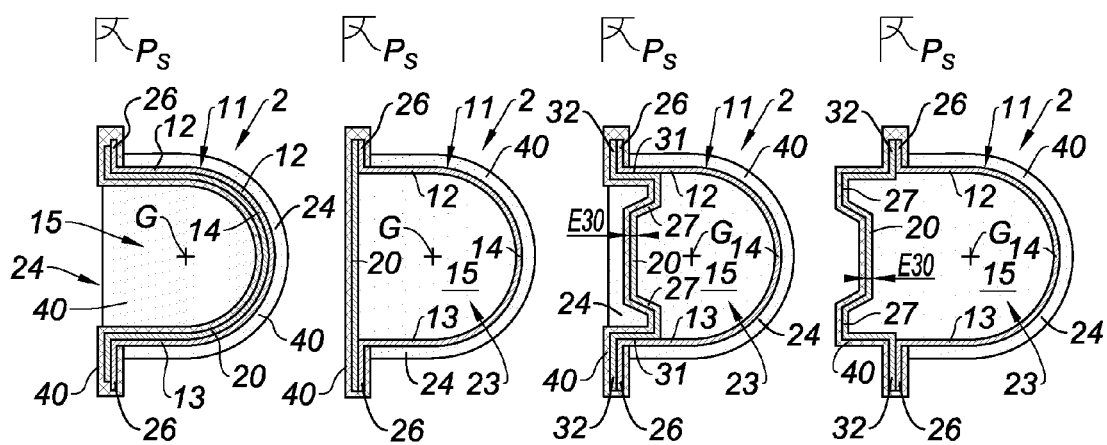

CROSSMEMBER FOR A VEHICLE DASHBOARD PROVIDED WITH A REINFORCING BACK BRACE MADE OF A FIBROUS COMPOSITE

CROSS REFERENCE TO RELATED APPLICATIONS

This application is the US National Stage of International Application No. PCT/EP2013/061389, which was filed Jun. 3, 2013 and which claims the priority to French application 1255343 filed on Jun. 7, 2012 the content (text, drawings and claims) of which is incorporated here by reference.

BACKGROUND OF THE INVENTION

The present invention relates to the general domain of crossmembers used in vehicle construction, and more specifically to crossmembers which are mounted to the vehicle body, transverse to the drive direction, to provide means for mounting the dashboard of the vehicle as well as various accessories such as climate control unit, steering column, fuse box, glove compartment, etc.

It is known that crossmembers generally comprise a crossbar made of steel tubing which extends between two mounting flanges securing the bar to the body of the vehicle, and which is usually also supported by a central strut attached to the floor of the vehicle.

Although known crossmembers generally perform satisfactorily, particularly because of their rigidity, they may nevertheless have some drawbacks.

Their fabrication may require particularly heavy, cumbersome and costly tooling, including for instance shear presses and welding machines, as well as stamping presses specially equipped with the necessary punches and dies.

In addition, the relatively heavy weight of known crossmembers complicates their manipulation during assembly and contributes to making the vehicle heavy, negatively affecting the fuel consumption of the vehicle.

Finally, it is often difficult to arrange the crossmember in the proper way in order to avoid the likelihood of resonance phenomena propagating towards the cabin which emanate from engine compartment vibrations or the vehicle body.

SUMMARY

Consequently, the goal of the invention is to propose a new crossmember for a vehicle dashboard which combines light weight and high mechanical properties, as required for the application, and especially with vibrational performance, rigidity and behavior comparable or superior than that of known metallic tubing.

Another goal of the invention is to propose a new fabrication method for dashboard crossmembers which provides a light weight and robust crossmember, which is versatile and simple, fast and inexpensive to implement.

The goals of the invention are achieved by means of a dashboard crossmember for a vehicle, the crossmember comprising a crossbar extending lengthwise according to a generating line G, intended to be oriented according to the width of the vehicle body, transverse to the driving direction of the vehicle, and at least one connecting flange designed for mounting the crossbar to the body of the vehicle, the crossmember being characterized in that the crossbar is formed, at least over a portion of its length, on the one hand by a first part forming a carrier core with a bulging lateral wall around the generating line G, in order to present, in a section perpendicular to the generating line, a first branch and a second branch connected with each other by a common connection part and bordering in this way a cavity, and on the other hand by a second part, different from the first part, forming a back brace made of a fiber reinforced composite material containing fibers arranged in a matrix, and which links the first branch with the second branch.

The goals of the invention are also achieved by means of a fabrication method for a vehicle dashboard crossmember which must be equipped with a crossbar extending lengthwise according to a generating line G, intended to be oriented according to the width of the vehicle body, transverse to the driving direction of the vehicle, and at least one connecting flange for mounting the crossbar to the body of the vehicle, the method being characterized in that it comprises a fabrication step (a) for the carrier core intended to form the basic structure of the crossbar over at least a portion of the length of the crossbar. In this step a rigid carrier core with bulging wall is created by curving or bending, for instance by means of bending or stamping operations, a basic blank of fibrous composite sheet, around the generating line G in order to form, according to a section perpendicular to the generating line, a first branch and a second branch connected with each other by a common connecting part and bordering in this way a cavity. The method further includes a step (b) in which a rigid back brace is fabricated from fibrous composite material, followed by a step (c) in which the preformed back brace is assembled to the branches of the carrier core, preferably at a distance from the connecting part, in order to form, over at least a portion of the length of the crossbar, a reinforced tubular stub.

Advantageously, the crossmember combines the light weight of a hollow carrier core with the structural strength of tubing with relatively large volume, due to the reinforcement provided by the reinforcing back brace which stabilizes the branches of the core, and in this way significantly improves the resistance of the assembly against flexion, torsion, impact and buckling.

Advantageously, the use of a brace of fibrous composite material, preferably with a polymer matrix, provides excellent mechanical properties, and specifically great robustness and high rigidity, by means of a material which is relatively light, less dense and generally lighter than a metallic alloy, which results in a lighter crossmember assembly.

In addition, this composite material is undeniably easy to form, so that its use in the method according to the invention results in lower cost for raw material, energy, or tooling.

The ease of forming of the composite material is reflected in the great freedom of choice relative to forms and dimensions of the reinforcing brace, so that it can be adapted to a multitudes of variants, and furthermore associated either with a same carrier core, or several types of carrier cores, in order to obtain the combination which gives the best performance, for a given vehicle, in terms of mechanical strength and/or vibrational characteristics.

Advantageously, with this kind of differentiation in the parts constituting the crossmember, whereby the form, dimensions or constituting material of each part can be adapted independently from the other parts, the modular character of the crossmember gives the method great versatility.

BRIEF DESCRIPTION OF THE DRAWINGS

Other objectives, characteristics and advantages of the invention will be presented in more detail in the following description, and with reference to the attached drawings, provided strictly for illustrative and non-limiting purposes, among which:

FIG. 1 is an exploded perspective view illustrating an example of a dashboard crossmember made in accordance with the claimed invention.

FIG. 2 is a perspective view illustrating the assembled crossmember of FIG. 1.

FIGS. 3A and 3B are perspective views illustrating a sheet with fibers crossing at an angle used to produce a variant of a reinforcing brace employed in the crossmembers of FIGS. 1 and 2 as well as, respectively, the brace obtained in this way starting from such a sheet.

FIGS. 4A and 4B are perspective views illustrating a sheet with continuous lengthwise fibers used to produce a variant of the carrier core employed in the crossmembers of FIGS. 1 and 2 as well as, respectively, the carrier core obtained in this way starting from such a sheet.

FIGS. 5, 6, 7 and 8 are transverse sectional views illustrating construction variants for the reinforcing brace employed in the crossmembers according to the invention.

DETAILED DESCRIPTION

A dashboard crossmember 1 for a vehicle comprises a crossbar 2 extending lengthwise according to a generating line G intended to be oriented according to the width of the vehicle body (not shown), transverse to the driving direction (forward-reverse) of the vehicle, as well as at least one connecting flange 3, 4 designed for mounting the crossbar 2 to the body of the vehicle (not shown).

It is understood that the invention relates also to a vehicle (not shown), and particularly an automotive vehicle, equipped with the dashboard crossmember 1.

Preferably, as illustrated in FIGS. 1 and 2, the crossmember 1 comprises at least two connecting flanges, 3, 4 arranged lengthwise on both sides of the crossbar 2, at the extremities of the latter, so that the flanges can be attached to both sides (left and right) of the vehicle body, so that once mounted the crossmember extends transverse to the drive direction of the vehicle, and approximately over the whole width of the vehicle.

Preferably, the crossmember includes a strut 5 anchored to the floor of the vehicle and supporting crossbar 2. The strut 5 is in an intermediate position at a distance from the two connecting flanges 3, 4 of the crossmember. The crossmember preferably includes a mounting fork 6, which preferably is deformable in case of impacts, and for instance is made of steel. The mounting fork 6 connects the crossmember, and more particularly crossbar 2, to a forward portion of the vehicle body, approximately facing the steering column.

By convention, and for ease of description, the horizontal forward/reverse driving direction of the vehicle is designated by "X", the transverse direction of the vehicle, which corresponds in general with the lengthwise extension of the crossmember 1 and more particularly of the crossbar 2 according to generating line G is designated by "Y" and the vertical direction, which forms with the preceding directions a direct trihedral, is designated by "Z".

The crossbar 2 is constituted over at least a portion of its length L2, on the one hand by a first part forming carrier core 10 which has a bulging side wall 11 around the generating line G, in order to present, in a section PS perpendicular to the generating line, a first branch 12 and a second branch 13 connected to each other by a common connecting part 14, and bordering a cavity 15, which opens preferably opposite the connecting part 14, as illustrated in FIGS. 1 and 5 to 8, and on the other hand by a second part, different from the first, which forms a reinforcing brace 20 made of fibrous composite material containing fibers 21 arranged in a matrix 22, and which connects branch 12 with the second branch 13.

According to a variant embodiment, corresponding with FIG. 5, the shape of reinforcing brace 20 conforms to the concave face of wall 11, and therefore of cavity 15.

According to other embodiments, corresponding with FIGS. 6, 7, and 8, the reinforcing brace 20 can connect the first branch 12 with the second branch 13 at a distance from the connecting part 14, in the way of a cover closing cavity 15, opposite the connecting part, and preferably according to a path which is not symmetric to that of wall 11.

The cavity 15 can remain empty, or on the contrary be filled with foam 23, such as polymer foam, in order to improve the capacity of the crossmember 1 to dampen or absorb vibrations.

According to another variant, corresponding for instance with the example of FIG. 5, the cavity 15 can be occupied at least partially by partitions or ribs 24, backing up the concave face of the brace 20, and, through its intermediary the concave face of wall 11.

Preferably, the carrier core 10, forming the hollow basic structure of the crossbar 2 extends over at least 50%, at least 75%, at least 80%, at least 90%, or over the whole length L2 of the crossbar, and more generally the whole length of the crossmember 1.

Advantageously, the carrier core 10 can form a beam type support structure, capable of supporting the crossbar over its whole length, and particularly of ensuring at least partially if not completely the rigidity of the crossbar 2, and especially of absorbing the compressive, tensile, torsional, or bending stresses that the crossbar is subjected to inside the vehicle.

Preferably, the carrier core follows a generating line G, or "central axis of generation" which is mostly straight, particularly in the lengthwise central portion of the crossbar 2, and preferably parallel to the Y direction of the vehicle.

It can however be envisaged that the generating line G is locally curved, and particularly that it presents, for instance towards its extremities, elbows 25 corresponding for instance with one of the deviations ΔX, ΔZ in X and/or Z, as illustrated in FIGS. 1, 2 and 4B in order, for instance to adapt, or to reinforce, the structural rigidity of the crossmember 1.

Preferably, the convex bulging of the wall 11, and more generally of the crossbar 2 is intended to be oriented towards the cabin of the vehicle, towards the rear, while the brace 20 is disposed in the back portion of the crossmember, towards the front of the vehicle, the body and hood side, preferably according to a vertical plane.

Preferably, the solid wall of the carrier core 10 follows a convex contour regularly bent in a U or in an Ω shape, as illustrated in FIGS. 1, 2, 4B and 5 to 8.

Although it is possible that the bulging of the wall 11 can be created by a broken line comprising a succession of adjacent segments (straight or curved) separated by folds, preference is given to a gradual and smooth curvature, which avoids stress concentrations and simplifies the construction of the core in a single piece and in a single forming pass, while preserving the integrity of the material constituting the core 10.

For this purpose, the connecting part 14 can, for instance, have a substantially arcuate outline, and more particularly a half-circle, which the branches 12 and 13, which are preferably parallel to each other, border tangentially.

The free extremities of the first branch 12 and of the second branch 13 preferably have flat mounting flaps 26 against which the reinforcing brace 20 locates.

Preferably, the flaps 26 can be formed in one piece with wall 11, by means of tabs folded preferably towards the exterior.

In addition, the flaps 26 situated on both sides of the cavity 15, can be in the same plane, and preferably located in the same vertical plane (parallel to the plane delimited by the Y and Z directions), in order to facilitate gluing and flat mounting of the brace 20 against the core 10.

Preferably, the assembly formed in this manner has an asymmetric transverse section, and preferably forms a tunnel of which the carrier core 10 forms the archway, like a spout, and the reinforcing brace 20 closes the base like a cover.

In any case, the assembly and more specifically the superimposition of the carrier core 10 and the brace 20, whether or not there is a cavity between these elements, results in the presence inside the crossbar 2 of a preferably straight reinforced section T, with a length corresponding with the distance of overlap between the core 10 and the brace 20, and which is relatively simple to produce.

Although it is possible that the reinforcing brace 20 extends over more than 50%, 75% or even the whole length L10 of the carrier core, and more generally the length L2 of the crossbar, the reinforcing brace 20 covers preferably at least 25%, at least 30%, and preferably approximately 35% or 40% of the length L2 of the crossbar 2, and more generally of the crossmember 1, as illustrated in FIGS. 1 and 2.

The length L20 of the brace, measured according to the generating line G, and therefore the length of the reinforced section T, is preferably smaller than the length L10 of the core 10, and more generally than the length L2, preferably equal to the length L2 of the crossbar.

The width of brace 20 can be equal to the width of the carrier core 10, if necessary including mounting flaps 26, as illustrated in FIGS. 1 and 5 to 8.

In a particularly preferential manner, the reinforced section T combining the core 10 and the brace 20 covers, or corresponds exclusively with, the section of the crossbar 2 to which are attached the first connecting flange 3 (on the left in FIGS. 1 and 2), the strut 5 and the fork 6.

It is indeed in the above defined triangular zone that the crossbar 2 is mechanically most stressed, and where it requires the most robust structure.

The length L20 of the brace 20 and its position relative to the core along the generating line G can therefore be determined, if necessary, in order to define a partial coverage necessary and sufficient for reinforcing the triangular zone, which leads to material savings by not unnecessarily reinforcing the rest of the crossbar 2; the brace 20 can for instance be interrupted starting from the strut 5, and the reinforcement can be omitted between the section, situated beyond the strut 5, and up to the second mounting flange 4 (here on the right).

If necessary, it can also be envisaged to provide several distinct reinforcing braces 20 distributed at a distance from each other along the crossbar 2, and more preferably along the same carrier core 10, in order to create a plurality of reinforced sections in the critical zones of the crossbar 2.

Preferably, the reinforced brace 20 is formed by a plate with folds or reliefs 27 with heights preferably greater than the base thickness E30 of the blank 30 used to produce the plate, whereby the reliefs 27 form ribs between branches 12, 13 connected by the plate contributing to the rigidity of the plate, as illustrated in FIGS. 1, 3B, 7 and 8.

Advantageously, such stiffening reliefs 27 can be obtained by stamping, bending, or ribbing, and contribute to raising the torsional modulus and the bending modulus of the brace 20, and in this way its torsion, flexion or buckling strength, while preserving its thinness and light weight.

The reinforcing brace 20 preferably has abutment shoulders which protrude inside the cavity 15, between the first and second branch 12, 13 in order to offer to the branches 12, 13 a support to prevent their moving closer to each other, as illustrated for instance in FIG. 7.

Advantageously, the brace 20 can form in this way a particularly strong column which effectively opposes the transverse crushing of the carrier core 10.

Preferably, the shoulders 31 can form secant planes with the mounting legs 32 which locate against the flaps 26, which results in a reinforced fixation and abutment effect in two distinct directions, approximately square to each other.

If necessary, the tie rod role of the brace 20 opposing the separation of the branches 12, 13 (and more particularly opening of the U shape), for instance under influence of torsion around the generating line G, can also be reinforced by this extension of contact and fixation surfaces.

Preferably, the shoulders 31 can coincide with all or part of the stiffening reliefs 27, as illustrated in FIG. 7.

It is however possible that, according to another variant embodiment, the stiffening reliefs 27 can be oriented towards the outside of the cavity, in this case protruding forward, as illustrated in FIG. 8.

The core 10 can be made of the same material as the reinforcing brace 20, or from a different material.

In a particularly preferential manner, just like the reinforcing brace 20, the carrier core 10 is also made of a fibrous composite material, comprising fibers 33 arranged in a matrix 34.

The reinforcing fibers 21, 33 of the brace 20 or the core 10 can be comprised of glass, carbon or aramid fibers, etc.

The matrices 22, 34 are preferably made of one or more polymer materials, such as polypropylene or polyamide, and more preferentially of one or more resin type thermoplastic polymers.

Compared to a metallic construction, the use of these composite materials advantageously results in a reduced weight crossbar 2, and therefore crossmember 1, while preserving, because of the reinforcement fibers 21, 33, the high elasticity module, the great rigidity, and the high resistance to traction, bending and buckling, under lateral compression stresses or shearing forces.

For this purpose, the crossbar 2 preferably has a hollow or tubular structure, delimited by a relatively thin composite skin, with low density relative to metal, but highly rigid and tough.

Furthermore, such fibrous composite materials can simplify the forming of the parts, while limiting the loss of raw material.

Obviously it is possible that core 10 and brace 20 are made of the same fibrous composite material, if necessary oriented in similar manner relative to the generating line G.

The fibrous composite material employed for the carrier core 10 preferably has a matrix 34, and/or fiber 33 composition, and/or fiber 33 orientation, and/or fiber 33 density which is different than the fibrous composite material used for the reinforcing brace 20.

As an example, to form the core 10, a composite of carbon fibers 33 can be used containing preferably 90% of the fibers at 0 degrees (in line with the generating line) and 10% of fibers at 90% (transverse to the generating line), as illustrated in FIG. 4A, and to form the brace 20, a composite with crossed glass fibers 21, arranged preferentially half at +45 degrees, and half at −45 degrees, as illustrated in FIG. 3A.

Advantageously, by combining the materials in this way, the different lateral portions of the reinforced section T can be given locally differentiated mechanical properties, the combination of which improves the mechanical strength and/or the vibrational characteristics of the assembly.

Preferably, the carrier core 10 and/or the brace 20 are formed in one piece from a single sheet of composite 30, 35 (also called "patch", which is a specific example of the "blank" adapted to composite technology) as shown in FIGS. 4A and 3A respectively.

In this way, substantial material savings can be realized, and in addition the parts can be formed rapidly, preferably each in a single cutting operation followed by a single striking operation, and more particularly in one thermoforming operation under a press, from one and the same corresponding patch 30, 35, which makes the fabrication method suitable for the production rates of the automotive industry, with cycle times of a few minutes, or even less than one minute.

Although particularly thin and light weight (resulting from the thickness of one patch 30, 35), the parts thus obtained are nevertheless particularly robust and homogenous, due to their fabrication in one piece.

The reinforcing brace 20 and/or the core 10 preferably have a plurality of continuous fibers 21, 33 parallel with each other and extending without interruption from one edge to the other of the brace 20, respectively from one edge to the other of the carrier core 10.

This continuity of fibers 21, 33 advantageously improves the mechanical strength of the corresponding patches 30, 35 and therefore of the parts obtained from these patches.

The orientation of the continuous fiber mesh or matrix can be chosen so that it corresponds with the direction of the most severe stresses to which the part is subjected.

If necessary, the fibers of the same patch can be arranged according to two crossed patterns of continuous fibers superimposed or interlaced in the manner of textile.

As an example, the carrier core 10 can comprise, preferably a majority, of continuous warp yarn fibers 33C disposed parallel to the generating line G, in the manner of lengthwise tie rods, and if necessary continuous weft yarn fibers 33T perpendicular to the warp fibers, especially in a ratio of 90%-10% such as described above, each fiber pattern 33C, 33T joining in this manner without interruption one corresponding cut edge of a preferably rectangular patch 35, with the opposite cut edge, as illustrated in FIG. 4A.

Preferably, the fibers 21 of the reinforcing brace 20 are arranged, at least partially, in a crossed pattern, for at least 25%, or 50%, according to an angle of +30 degrees to +60 degrees, and preferably of +45 degrees relative to the generating line G, and for at least 25%, or 50%, according to an angle of −30 degrees to −60 degrees, and preferably of −45 degrees relative to the generating line G.

In this way, the fibers can continuously connect, preferably at ±45 degrees, one cut edge of the corresponding patch 30, which is preferably rectangular, with the adjacent cut edge.

As illustrated in FIGS. 1, 2 and 5 to 8, the carrier core 10, and more generally the crossbar 2, can be coated over its whole length or part of its length, on at least one of its faces, or on two faces, with a non-metallic coating layer 40, made preferably through over-molding, in a polymer material, preferably a composite material and different from the composite material which constitutes the carrier core 10 and/or brace 20.

The coating layer 40 can, for instance, be created in a polypropylene or polyamide type polymer material, if necessary reinforced with short non-continuous fibers, with individual lengths smaller than 25 mm, or 10 mm, or ultra-short fibers measuring between 2 mm and 4 mm, and specifically in PA6GF60.

Advantageously, such material is particularly suitable to be formed by injection over-molding on the carrier core 10, which locally backed by the brace 20 forms the true functional armature of the crossbar 2.

Such coating layer 40 can be used to add to the crossmember 1, and more particularly to the crossbar 2, elements providing additional functions, and not contributing to, or only marginally contributing to, the structural strength of crossbar 2, such as for instance leg or eyelet type mounting interfaces used for mounting to the crossmember accessories as the climate control group, the radio, the glove compartment, etc.

Advantageously, all or part of the mounting interfaces, until now made of metal, can be replaced by elements in a (second) composite material, reducing in this way the weight of the crossmember 1.

The coating layer 40 can also be used to add point ribbing 24 in the cavity 15 (FIG. 5), and/or along the exterior surface of the bulging wall 11 (FIGS. 5 to 8), and/or a rib backing 24, or a filling, of visible stiffening reliefs 27 of the brace 20 (FIG. 7).

As illustrated in FIG. 7, the coating layer can comprise for this purpose on the one hand a thin base plate with constant thickness conforming to the outside surface of the reinforcing brace 20 along the generating line G, the base plate being locally reinforced by transverse ribs 24 or partitions with height equal to the height of the stiffening reliefs 27, and on the other hand by covering arch type ribs conforming to the outside surface of the bulging wall 11.

In this way it can be also envisaged to back up the reinforced section T by means of transverse ribbing 24 overmolded from each side, or over the whole lateral periphery of the section.

The crossmember 1 can therefore have a generally multilayered structure differentiated in its composition and function, comprising at least a first carrying armature layer formed by the core 10, and if necessary the brace 20, preferably made from preformed patches 30, 35 with continuous fibers, and a second coating layer 40 offering for instance additional mounting interfaces, preferably formed by over-molding in a composite with short fibers.

According to a variant embodiment, the mounting flange(s) 3, 4 can be made of a fibrous composite material, which can be identical for both flanges, even coming from the same material from which the core 10 is made.

Of course, a person skilled in the art will be able to adapt the invention to his needs by isolating or combining all or part of the above mentioned characteristics.

The invention also relates to a method for fabricating a dashboard crossmember 1 for a vehicle, which must be provided with a crossbar 2, extending lengthwise according to a generating line G, intended to be oriented according to the width of the vehicle body, transverse to the driving direction of the vehicle, and at least one mounting flange 3, 4 designed for mounting the crossbar to the body of the vehicle.

The method of fabricating the dashboard crossmember comprises a step (a) in which a carrier core 10 is fabricated, which is intended to form the basic structure of the crossbar 2 over at least part of the length of the crossbar. In this step a rigid carrier core 10 with a bulging wall is made by curving or bending, for instance by bending or stamping, a base blank 35, from a fibrous composite sheet, around the generating line G in order to form, in a section perpendicular to the generating line, a first branch 12 and a second branch 13 which are connected to each other by a common connecting part 14 and which border a cavity 15. The method further includes a step (b) of fabricating a composite reinforcing brace 20 in which a rigid reinforcing brace 20 is produced in a fibrous composite material, followed by an assembly step (c) in which the preformed reinforcing brace 20 is attached to branches 12, 13 of the carrier core 10, preferably at a distance from the connecting part 14, in order to form, over at least a portion of the length L2 of the crossbar, a reinforced tubular section T.

Advantageously, the assembly of the separately preformed core 10 and brace 20 can be created by any appropriate assembly method, particularly at the interface of the flaps 26 and the mounting legs 32, and specifically by riveting, welding, for instance by hot welding or ultrasonic welding, by gluing, for instance with epoxy or polyurethane type structural glue, or by interlacing the fibers of one of the patches 30 with the fibers of the adjacent patch 35 through a stitching operation, if necessary through the intermediary of fiber sutures made for this purpose through the patches.

Advantageously, a solidly connected "all composite" base sub-assembly is obtained in this manner, which is particularly light and strong.

The over-molding of the coating layer 40 on the base sub-assembly can take place after this first assembly step, followed by the mounting of the strut 5 and the fork 6.

The invention claimed is:

1. A dashboard crossmember for a vehicle, said crossmember comprising:
    a crossbar which extends lengthwise according to a generating line (G), intended to be oriented according to the width of the vehicle body, transverse to the driving direction of said vehicle,
    at least one mounting flange designed for mounting said crossbar to the body of said vehicle,
    wherein said crossbar is formed, at least over a portion of its length, by a first part forming a carrier core and by a second part different from the first part and which forms a rigid reinforcing brace; said carrier core comprising a side wall bulging around said generating line (G) so as to present, in a section perpendicular to the generating line, a first branch and a second branch which are connected to each other by a common connecting part and which border a cavity; said reinforcing brace connecting the first branch of said carrier core with the second branch of said carrier core, said reinforcing brace being made from fibrous composite material containing fibers arranged in a matrix, and wherein the rigid reinforcing brace covers at approximately 25% to 50% of a length (L2) of the crossbar.

2. The crossmember according to claim 1 wherein the carrier core is made from a fibrous composite material which has a matrix composition, and/or fibers, and/or an orientation of fibers different from the fibrous composite material of the reinforcing brace.

3. The crossmember according to claim 1 wherein the carrier core and/or the reinforcing brace are formed in one piece from a single sheet of composite material.

4. The crossmember according to claim 1 wherein the reinforcing brace and/or the carrier core have a plurality of continuous fibers running substantially parallel to each other, each extending without interruption from one edge to the other of said brace, respectively from one edge to the other of said carrier core.

5. The crossmember according to claim 1 wherein the fibers of the reinforcing brace are arranged at least partially according to a crossed network, with at least 25% of the fibers at an angle of +30 degrees to +60 degrees relative to the generating line (G), and at least 25% of the fibers at an angle of −30 degrees to −60 degrees relative to said generating line (G).

6. The crossmember according to claim 1 wherein the reinforcing brace is formed by a plate with folds or reliefs forming ribs positioned between said branches of said carrier core, said ribs contributing to the rigidity of the reinforcing brace.

7. The crossmember according to claim 1 wherein the reinforcing brace has separation shoulders which protrude inside the cavity, between said branches, in order to provide said branches with a support to prevent their moving closer together.

8. The crossmember according to claim 1 wherein the side wall of the carrier core follows a convex contour regularly bent into a U- or Ω-shape and in that the free extremities of the first and second branches have flat mounting flaps against which the reinforcing brace rests.

9. The crossmember according to claim 1 wherein the fibers of the reinforcing brace are arranged at least partially according to a crossed network, with at least 50% of the fibers at an angle of +30 degrees to +60 degrees relative to the generating line (G), and at least 50% of the fibers at an angle of −30 degrees to −60 degrees relative to said generating line (G).

10. The crossmember according to claim 1 wherein the fibers of the reinforcing brace are arranged at least partially according to a crossed network, with at least 25% of the fibers at an angle of +45 degrees relative to the generating line (G), and at least 25% of the fibers at an angle of −45 degrees relative to said generating line (G).

11. The crossmember according to claim 1 wherein the fibers of the reinforcing brace are arranged at least partially according to a crossed network, with at least 50% of the fibers at an angle of +45 degrees relative to the generating line (G), and at least 50% of the fibers at an angle of −45 degrees relative to said generating line (G).

12. The crossmember according to claim 1 wherein the reinforcing brace covers at approximately 35% or 40%, of the length (L2) of the crossbar.

13. A method for fabricating a dashboard crossmember for a vehicle to be equipped with a crossbar, and which extends lengthwise according to a generating line (G), intended to be oriented according to the width of the body of the vehicle, transverse to the driving direction of said vehicle, and at least one connecting flange designed for mounting said crossbar to the body of said vehicle, said method comprising:
    a step (a) of producing a carrier core for forming the basic structure of the crossmember over at least a portion of the length of said crossbar, whereby a rigid carrier core with a bulging wall is created by curving or bending a fibrous composite base blank around said generating line (G) in order to form, in a section perpendicular to said generating line, a first branch and a second branch which are connected to each other by a common connecting part and which border a cavity,
    a step (b) of fabricating a rigid reinforcing brace from a fibrous composite material comprised of fibers arranged in a matrix, and
    after said step (b), an assembly step (c) of attaching the preformed reinforcing brace to the branches of the carrier core in order to form, over at least a portion of the length (L2) of the crossbar, a reinforced tubular section (T); and wherein the reinforcing brace covers at approximately 25% to 50% of a length (L2) of the crossbar.

14. The method according to claim 13 wherein said step (c) of attaching the preformed reinforcing brace to the branches of the carrier core comprises attaching the reinforcing brace to the carrier core at a distance from the connecting part in order to form, over at least a portion of the length (L2) of the crossbar, a reinforced tubular section (T).

15. A dashboard crossmember for a vehicle, said crossmember comprising:

a crossbar which extends lengthwise according to a generating line (G), intended to be oriented according to the width of the vehicle body, transverse to the driving direction of said vehicle, at least one mounting flange designed for mounting said crossbar to the body of said vehicle, wherein said crossbar is formed, at least over a portion of its length, by a first part forming a carrier core and by a second part different from the first part and which forms a rigid reinforcing brace; said carrier core comprising a side wall bulging around said generating line (G) so as to present, in a section perpendicular to the generating line, a first branch and a second branch which are connected to each other by a common connecting part and which border a cavity; said reinforcing brace connecting the first branch of said carrier core with the second branch of said carrier core, said reinforcing brace being made from fibrous composite material containing fibers arranged in a matrix, and wherein the rigid reinforcing brace covers at approximately 35% or 40% of a length (L2) of the crossbar.

* * * * *